June 22, 1965 J. R. EMMETT ETAL 3,190,729
BAFFLED REACTOR TOWER
Filed Aug. 2, 1961
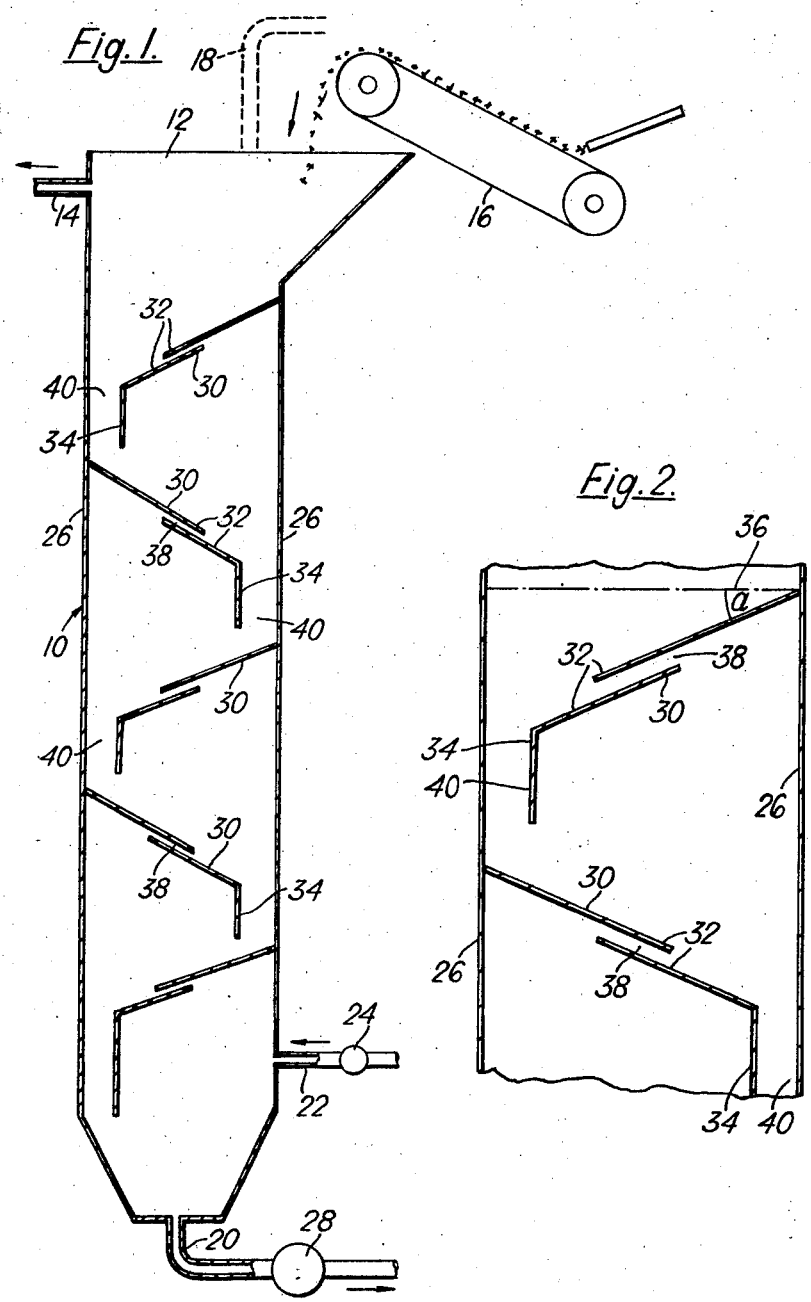
Inventors
James Ratcliffe Emmett
James McGrath
By Fred L. Witherspoon, Jr.
Attorney 3,190,729
BAFFLED REACTOR TOWER
James Ratcliffe Emmett, Ponteland, Newcastle-upon-Tyne, and James McGrath, Newcastle-upon-Tyne, England, assignors, by mesne assignments, to Weir Water Treatment Limited, Purley, England, a British company
Filed Aug. 2, 1961, Ser. No. 128,731
Claims priority, application Great Britain, Aug. 4, 1960, 27,098/60
2 Claims. (Cl. 23—283)

This invention relates to apparatus for effecting continuous counter-current contact between a particulate solid material and a liquid, and to a method of bringing about such contact between the two. The invention is particularly applicable to heterogeneous reactions where the solid material is an ion-exchange resin, and has as its aim the provision of apparatus which ensures effective counter-current contact between the solid material and the liquid but which is also as compact as possible.

According to the invention, the apparatus comprises a column having a particle-inlet and a liquid-outlet at or near one end, and a particle-outlet and a liquid-inlet at or near the other end, in which a number of baffles are arranged within the column at intervals so as to form a substantially zig-zag path for the particles, the baffles forming flow surfaces some of which are inclined to the walls of the column and others of which serve to constrict the flow of particles through the column.

As indicated above, the invention also extends to a method of effecting continuous counter-current contact between a particulate solid material and a liquid, the method comprising guiding the particles in a substantially zig-zag path as they move under gravity through a column of upwardly-moving liquid.

In order that the invention may be thoroughly understood, a specific column in accordance with it will now be described with reference to the accompanying drawing, in which:

FIGURE 1 is a vertical section through the column; and

FIGURE 2 is an enlarged fragment of FIGURE 1.

The column 10 shown in the drawing is an upright vessel of rectangular cross-section having an inlet 12 for particulate solid material and an outlet 14 for liquid both arranged at or near the upper end of the column. An endless belt 16 serves to feed the particles into the column, although a simple supply pipe 18 conveying a suspension of the particles can be used instead of the endless belt in many circumstances.

The lower end of the column is provided with an outlet pipe 20 for the withdrawal of particulate solid material and an inlet 22 for liquid. Upward movement of the liquid through the column from the inlet 22 to the outlet 14 is effected by a pump 24, while withdrawal of solid particles through the pipe 20 is carried out by means of the withdrawal pump 28. Control means (not shown) are provided to vary the output of these pumps so as to vary the rate of flow of particulate solid material and liquid through the column.

In order to secure effective counter-current contact between the particulate solid material and the liquid within the column 10, the particles are guided in a substantially zig-zag path as they move under gravity through the column of upwardly-moving liquid. This zig-zag motion of the particles is achieved by arranging a number of baffles 30 within the column 10 at regular intervals, the baffles being in the form of plates fixed to the walls of the column. Some of the flow surfaces 32 formed by the baffles are inclined to the walls of the column, while other flow surfaces 34 lie substantially parallel to the opposing column walls 26. In most cases the inclined flow surfaces 32 will slope towards the particle-outlet end of the column 10 by an angle $a$ in excess of 10° to a transverse plane 36 lying at right angles to the walls of the column, and the angle $a$ will be generally between 15° and 45°.

As will be seen from the drawing, the inclined surfaces 32 of the baffles include stepped portions providing apertures 38 through which liquid flow can take place, the stepped portions being formed by baffle plates which overlap one another. Further, the baffle surfaces 34 lying substantially parallel to the opposing column walls 26 form constricted passages or chutes 40 and are joined along their upper edges to the inclined baffle surfaces 32.

In operation of the column 10 shown in the drawing, solid particles are fed into the top of the column through the pipe 18 or by the endless belt 16 and slide down the inclined surfaces 32 of the uppermost baffle 30 into the vertical chute 40 where the particles gravitate downwards on to the inclined surfaces 32 of the next lower baffle. At the same time, liquid flows up the column due to the action of the pump 24, the greater part of the liquid passing through the apertures 38 at the stepped portions of the baffles and the smaller part of the liquid passing up through the vertical chutes 40. The size of the apertures 38 is such that the proportion of liquid which passes upwards through the vertical chutes 40 is sufficiently small to prevent fluidization of the particles in the vertical chutes. The surfaces 32 of the baffles are inclined at angles $a$ which permit the particles to gravitate when the flow of liquid is interrupted, and during normal working the particles pack in the vertical chutes 40 and form a layer on the inclined baffle surfaces 32. The residence time of the particulate material within the column is varied by varying the rate at which the particles are withdrawn by the pump 28 from the bottom of the column.

A typical column in accordance with the invention has been run with a downward particle rate of flow of 2 to 12 cubic feet per hour per square foot of cross-sectional area of the column, and an upward flow of liquid varying from 25 to 216 gallons per hour per square foot of cross-sectional area of the column. Another column has been run with a downward particle rate of flow of 52 cubic feet per hour per square foot of cross-sectional area of the column, and an upward flow of liquid varying from 25 to 390 gallons per hour per square foot of cross-sectional area of the column.

The ratio of the through-put of liquid to the through-put of particulate solid material depends on:
 (a) The type of process which is being worked.
 (b) The characteristics of the particles.
 (c) The change in the granular material required. This is mainly dictated by the economics of the process.
 (d) The change in the liquid required.

The ratio of the through-put of liquid to the through-put of particulate solid material is large in the following processes:
 (i) Adsorption of a small quantity of material by the particles from a large quantity of liquid.
 (ii) Normal water-softening ion-exchange processes where sodium ions of the particles are exchanged for calcium and magnesium ions in the liquid.
 (iii) Prevention of scale in saline water evaporators.

The ratio of the through-put of liquid to the through-put of particulate solid material is small in the following processes:
 (i) The leaching of particles with water, acid, alkali, or another liquid to give a small quantity of product solution.
 (ii) The stripping of absorbed material from the particles.
 (iii) The conversion of ion exchange particles from one form to another, for example, the regeneration of ion exchange particles used for water softening so as to exchange the calcium and/or magnesium ions of the particles for sodium ions.

(iv) The regeneration of ion exchange material in the prevention of scale in saline water evaporators.

The following example illustrates the invention.

A column constructed as shown in the drawing was worked as a regenerant column in order to exchange calcium cations absorbed by the resin for sodium. The column was twelve feet high, and was mounted on top of a rinse column of similar construction. Saturated sodium chloride solution was used as the regenerant which was introduced into the column above the rinse column, the liquid flow up the regenerant column being therefore a mixture of strong regenerant and rinse water. The results obtained during three tests using the column are tabulated below.

|  | Test I | Test II | Test III |
|---|---|---|---|
| Particle flow down the column in cubic feet per hour per square foot of cross-sectional area of the column | 7.3 | 4.25 | 5.18 |
| Liquid flow up the column in gallons per square foot of cross-sectional area of the column | 44 | 76.5 | 158 |
| Percentage of calcium ions among the total exchangeable ions of the input particles | 99-100 | 99-100 | 99-100 |
| Percentage of sodium ions among the total exchangeable ions of the output particles | 56.5 | 72.2 | 95.2 |
| Regenerant efficiency expressed as a percentage | 85 | 60.5 | 20 |

In test I the column was operated in conjunction with a second column used for softening a hard water. The hardness was reduced from 320 mg./litre as $CaCO_3$ to 52.5 mg./litre as $CaCO_3$. Residual hardness after softening of this magnitude is satisfactory for potable water purposes and the regenerant efficiency achieved in this example represents a substantial improvement over conventional techniques.

We claim:

1. A column for effecting continuous counter-current contact between a particulate solid material and a liquid, a particle-inlet and a liquid-outlet adjacent the top of said column, a particle-outlet and a liquid-inlet adjacent the bottom of said column, a plurality of baffle assemblies arranged within the column to provide a zig-zag path for said particles, each baffle assembly comprising a downwardly sloping planar baffle extending from one wall of the column, said baffle having a length less than the distance across the column along the line defined by the slope of the baffle, a second planar baffle spaced beneath and parallel to the first baffle, the contiguous ends of the two baffles overlapping each other to form a liquid passageway therebetween, the other and lower end of the second baffle being spaced from the wall of the column, and a third baffle extending downwardly from the lower end of the second baffle parallel to said wall, the third baffle together with the wall portion adjacent thereto forming a chute through which the solid particles pass from one chamber to the next, each successive baffle assembly being spaced from and extending in a direction opposite to the baffle assembly immediately above, the space between the contiguous ends of the two baffles being such that the proportion of liquid flowing upwardly through the chute is insufficient to fluidize the particulate solid material fed downwardly therethrough.

2. The invention as described in claim 1 and wherein the first baffle of each baffle assembly slopes downwardly at an angle of not less than 10° to a transverse plane lying at right angles to the walls of the column.

References Cited by the Examiner

UNITED STATES PATENTS

| 719,756 | 2/03 | Currie | 23—285 |
| 2,613,138 | 10/52 | Van Loon | 23—284 |
| 2,716,587 | 8/55 | Hillard | 23—1 |
| 2,768,071 | 10/56 | Pokorny et al. | 23—270.5 |

FOREIGN PATENTS

| 691 | 1871 | Great Britain. |
| 19,188 | 8/09 | Great Britain. |

MORRIS O. WOLK, *Primary Examiner.*

MAURICE A. BRINDISI, JAMES A. TAYMAN, JR., *Examiners.*